United States Patent
Lee et al.

(10) Patent No.: US 8,761,934 B2
(45) Date of Patent: Jun. 24, 2014

(54) METHOD AND SYSTEM FOR PERFORMING SEAMLESS LOCALIZATION

(75) Inventors: Chang Eun Lee, Daejeon (KR); Tae-Kyung Sung, Daejeon (KR); Sung Hoon Kim, Daejeon (KR); Hyun-Ja Im, Daejeon (KR); Young-Jo Cho, Daejeon (KR)

(73) Assignees: Electronics and Telecommunications Research Institute, Daejeon (KR); The Industry & Academic Cooperation in Chungnam National University, Daejeon (KR)

( * ) Notice: Subject to any disclaimer, the term of this patent is extended or adjusted under 35 U.S.C. 154(b) by 244 days.

(21) Appl. No.: 13/328,557

(22) Filed: Dec. 16, 2011

(65) Prior Publication Data

US 2012/0158177 A1      Jun. 21, 2012

(30) Foreign Application Priority Data

Dec. 17, 2010   (KR) ........................ 10-2010-0130194

(51) Int. Cl.
*G05D 1/02*   (2006.01)

(52) U.S. Cl.
USPC ............................................. 700/248; 901/1

(58) Field of Classification Search
USPC ................. 700/245, 248, 249, 253, 257, 264; 701/1, 23–26, 2, 472, 482, 522, 526, 701/400; 901/1–3, 8–10, 23; 318/568.2, 318/568.11
See application file for complete search history.

(56) References Cited

U.S. PATENT DOCUMENTS

| 8,195,343 | B2* | 6/2012 | Lin ................................... 701/2 |
| 8,271,132 | B2* | 9/2012 | Nielsen et al. ................ 700/250 |
| 8,364,189 | B2* | 1/2013 | Mintah et al. ................. 455/518 |
| 2009/0062974 | A1 | 3/2009 | Tamamoto et al. |
| 2010/0074133 | A1 | 3/2010 | Kim et al. |

FOREIGN PATENT DOCUMENTS

| KR | 1020090070407 | 7/2009 |
| KR | 1020100034534 | 4/2010 |

* cited by examiner

*Primary Examiner* — Dalena Tran
(74) *Attorney, Agent, or Firm* — Nelson Mullins Riley & Scarborough LLP; Anthony A. Laurentano, Esq.; Dipti Ramnarain, Esq.

(57) ABSTRACT

A system achieves seamless localization for a plurality of robots when first some robots moves to a shadow area where GPS signals are not received while remaining second robots receives the GPS signals, by performing an absolute localization for the second robots using the GPS signals; and performing an absolute localization for the second robots using the GPS signals; performing a relative localization for the first robots based on the second robots, thereby determining an absolute location of the first robots. Further, when the second robots move to the shadow area where the first robots have been moved, the system performs the seamless localization by determining a relative location of the second robots based on the first robots on which the relative localization has been performed, thereby determining an absolute location of the second robots based on the relative location of the second robots.

14 Claims, 4 Drawing Sheets

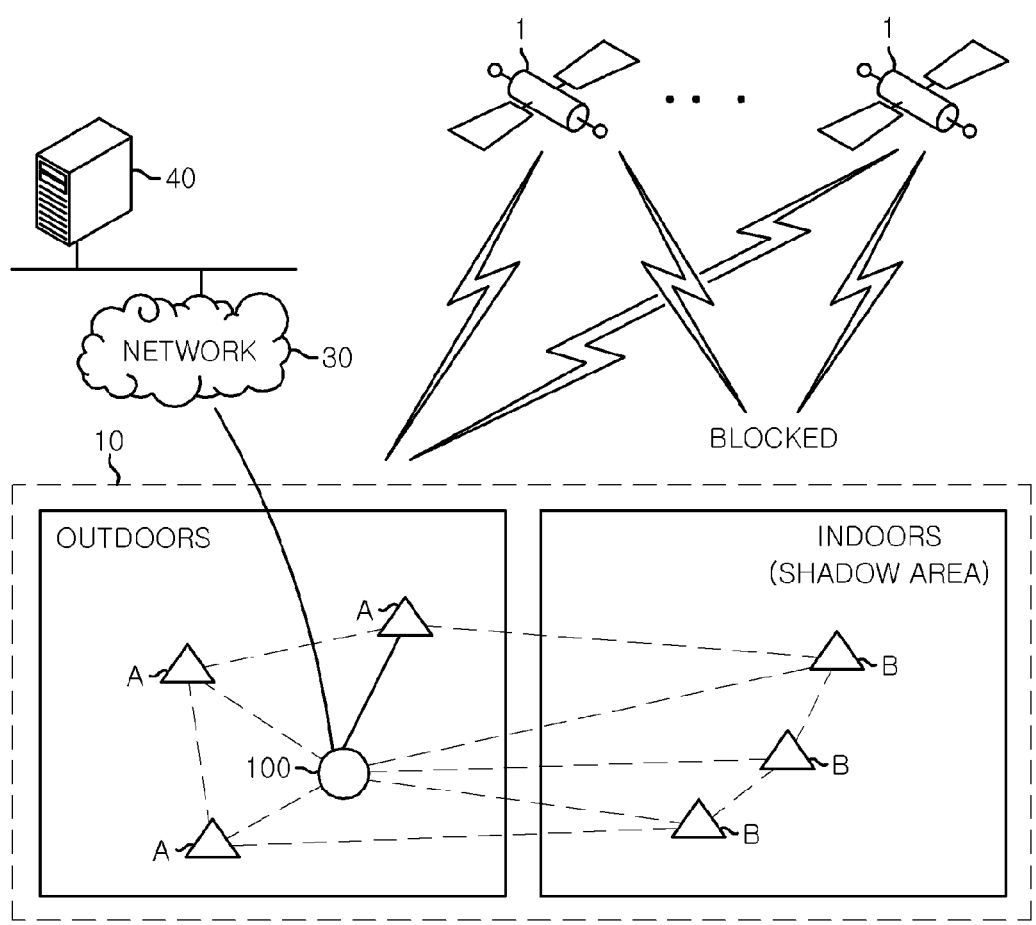

$T\_rtt = T\_ap - T\_trx$

METHOD AND SYSTEM FOR PERFORMING SEAMLESS LOCALIZATION

CROSS-REFERENCE TO RELATED APPLICATION(S)

The present invention claims priority of Korean Patent Application No. 10-2010-0130194, filed on Dec. 17, 2010, which is incorporated herein by reference.

FIELD OF THE INVENTION

The present invention relates generally to an indoor/outdoor seamless localization technology for providing real-time location information about mobile swarm robots and, more particularly, to a system and method for easily performing seamless localization of robots moving even in a shadow area.

BACKGROUND OF THE INVENTION

Robots that are moving outdoors are able to receive Global Positioning System (GPS) signals to obtain their absolute localization on the ground, and the accuracy of such absolute localization is to about several tens of meters. Further, when several swarm robots that receive GPS signals are configured in the form of an ad-hoc mesh network on the basis of local area communication such as Wireless Local Area Network (WLAN) or Wireless Personal Area Network (WPAN) communication, error factors in GPS signals which are present between the robots can be eliminated, and thus more precise localization is possible.

However, in a situation in which the robots that are moving in an atypical environment, for example, the robots that are moving from indoors to outdoors, move to an indoor shadow area which makes it impossible to receive GPS signals, it is substantially difficult to perform localization.

That is, the localization technology for swarm robots is merely a technology that offers the simple support of the mobility of nodes, i.e., mobile robots, in a wireless sensor network, in particular, a location-awareness messaging technology for promptly measuring and transferring the locations of the mobile robots via a series of messages and a link control process in the wireless sensor network. However, such a localization technology is disadvantageous in that since it focuses on efficient link access control to provide the location-awareness of the mobile robots and a messaging method to provide such efficient link access control, a mechanism for indoor/outdoor seamless localization in an atypical environment cannot be provided.

SUMMARY OF THE INVENTION

It is, therefore, an object of the present invention to provide a system and method for easily performing seamless localization of robots moving in an atypical environment even in a shadow area by configuring an ad-hoc mesh network using communication between the robots and performing the relative localization and control of the robots.

In accordance with an aspect of the present invention, there is provided a system for performing seamless localization, comprising:

a plurality of mobile robots within a cluster, each mobile robot configured to receive Global Positioning System (GPS) signals to provide a absolute position;

a network for providing a wide area communication environment for the mobile robots; and a control center configured to monitor when first some mobile robots moves to a shadow area where the GPS signals are not received while remaining second mobile robots receives the GPS signals, and perform seamless localization for the first mobile robots over the network.

Preferably, the mobile robots comprise:

a mother robot and one or more child robots, wherein the mother robot is configured to collect information about the absolute locations of the child robots, and transfer the information about the absolute location to the control center over the network; and the child robots are configured to perform a local area communication with the mother mobile robot.

Preferably, the control center is configured to perform the seamless localization by:

performing an absolute localization for the second mobile robots using the GPS signals;

performing an absolute localization for the second mobile robots using the GPS signals; performing a relative localization for the first mobile robots based on the second mobile robots; and determining an absolute location of the first mobile robots based on the relative localization for the first mobile robots.

Preferably, the control center is further configured to monitor when the second mobile robots move to the shadow area where the first mobile robots have been moved, and perform the seamless localization by:

determining a relative location of the second mobile robots based on the first mobile robots on which the relative localization has been performed; and determining an absolute location of the second mobile robots based on the relative location of the second mobile robots.

Preferably, the network comprises Wide Area Network (WAN).

Preferably, the local area communication comprises a Wireless Local Area Network (WLAN) or a Wireless Personal Area Network (WPAN).

Preferably, the WLAN comprises a Wireless-Fidelity (Wi-Fi) network.

Preferably, the WPAN is any one of Bluetooth, ZigBee, and Ultra-Wideband (UWB) networks.

Preferably, the mobile robots are networked using an ad-hoc mesh network.

In accordance with another aspect of the present invention, there is provided a method for performing seamless localization for mobile robots in a cluster, wherein first some mobile robots moves to a shadow area where Global Positioning System (GPS) signals are not received while remaining second mobile robots receives the GPS signals, the method comprising:

performing an absolute localization for the second mobile robots using the GPS signals; performing a relative localization for the first mobile robots based on the second mobile robots; and determining an absolute location of the first mobile robots based on the relative localization for the first mobile robots.

Preferably, the method further comprises:

when the second mobile robots move to the shadow area where the first mobile robots have been moved, determining a relative location of the second mobile robots based on the first mobile robots on which the relative localization has been performed; and determining an absolute location of the second mobile robots based on the relative location of the second mobile robots.

Preferably, said performing a relative localization for the first mobile robots based on the second mobile robots includes performing communication between the first and second mobile robots via local area communication.

Preferably, the local area communication is implemented using Wireless Local Area Network (WLAN) Two Way Ranging (TWR).

Preferably, the WLAN TWR comprises peer-to-peer networking within the group of mobile robots.

Preferably, the mobile robots are internetworked using an ad-hoc mesh network.

BRIEF DESCRIPTION OF THE DRAWINGS

The above and other objects and features of the present invention will become apparent from the following description of preferred embodiments given in conjunction with the accompanying drawings, in which:

FIG. 2 is a diagram illustratively showing a method for performing seamless localization, in particular, the method performed when some mobile robots have moved to a GPS signal shadow area in accordance with the present invention;

DETAILED DESCRIPTION OF THE PREFERRED EMBODIMENTS

Hereinafter, embodiments of the present invention will be described in detail with reference to the accompanying drawings so that they can be readily implemented by those skilled in the art.

Figure 1:
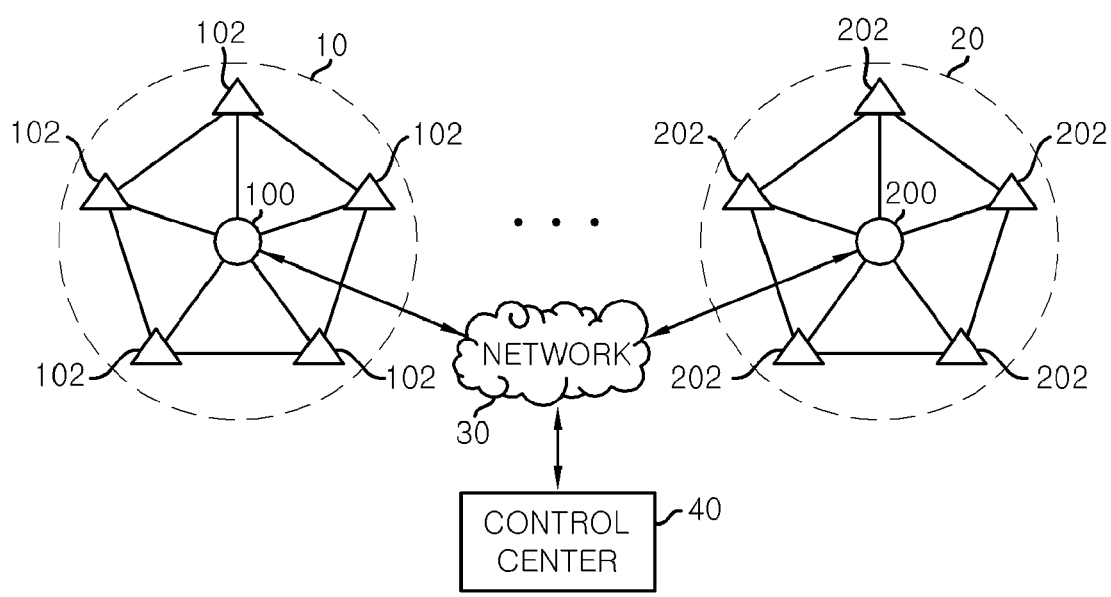
FIG. 1 is a diagram schematically showing a system for performing seamless localization of mobile robots in accordance with an embodiment of the present invention.

FIG. 1 is a diagram schematically showing a system for performing seamless localization of mobile robots in accordance with an embodiment of the present invention.

The seamless localization system includes a plurality of clusters 10 and 20, and a control center 40, which are connected to a Wide Area Network (WAN) 30.

As shown in FIG. 1, a first cluster 10 includes a plurality of mobile robots, for example, a single mother robot 100 and a remainder of child robots 102.

The mother robot 100 includes a broadband communication network interface mounted thereon, for example, a Wide Area Network (WAN) interface, and is then capable of communicating with the control center 40 over the WAN 30. The mother robot 100 localizes the positions of the child robots 102 within the first cluster 10, collects information about the localized positions, and transfers the localized position information to the control center 40 over the WAN 30.

The child robots 102 within the first cluster 10 each have a local area communication interface mounted thereon for communicating with the mother robot 100, for example, a Wireless Local Area Network (WLAN) interface or a Wireless Personal Area Network (WPAN) interface, thus configuring one cluster based on the mother robot 100.

For example, the WLAN may include a Wireless Fidelity (Wi-Fi) network, and the WPAN (Wireless Personal Area Network) may include a Bluetooth network, a Zigbee network, an Ultra-Wideband (UWB) network, or the like.

In FIG. 1, the number of the child robots 102 is shown to be five, but it should be noted that the number of child robots is only exemplary for the sake of the description of the embodiment, and does is not especially limited to such an example depending on the system.

Similarly to the first cluster 10, the second cluster 20 includes a plurality of mobile robots, for example, a single mother robot 200 and a remainder of child robots 202.

The mother robot 200 has a network interface mounted thereon, for example, a WAN interface, and is then capable of communicating with the control center 40 over the WAN 30. The mother robot 200 localizes the positions of the child robots 202 within the second cluster 20, collects information about the localized positions, and transfers the localized position information to the control center 40 over the WAN 30.

The child robots 202 within the second cluster 20 each have a local area communication interface mounted thereon for communicating with the mother robot 200, for example, a WLAN interface or a WPAN interface, thus configuring the cluster based on the mother robot 200. For example, the WLAN may include a WiFi network, and the WPAN may include a Bluetooth, Zigbee, or UWB network.

The WAN 30 may be, for example, a WAN, and provides a broadband communication service environment by connecting the first cluster 10, second cluster 20, and control center 40 to one another.

The control center 40 functions to monitor in real time the positions of the mobile robots within the first cluster 10, that is, the mother robot 100 and the child robots 102, and the mobile robots within the second cluster 20, that is, the mother robot 200 and the child robots 202. Further, the control center 40 performs seamless localization for the mobile robots in the first and second cluster 10 and 20, which will be discussed, hereinafter FIG. 2 is a diagram illustratively showing a method for performing seamless localization of mobile robots, in particular, the method performed when some mobile robots have moved to a GPS signal shadow area, in accordance with the present invention.

As shown in FIG. 2, the mother robot 100 within any mobile robot group, for example, the first cluster 10, is connected to the control center 40 over the WAN 30, and the mobile robots within the first cluster 10 performs an absolute localization through the use of GPS satellites 1.

In case where some mobile robots, for example, a group B of mobile robots, within the first cluster 10, moves to an indoor shadow area, the absolute localization for the group B of mobile robots cannot be determined through the use of the GPS satellites 1.

In accordance with this embodiment of the present invention, an absolute location of the group B of mobile robots can be obtained as follows.

First of all, the mother robot 100 performs an absolute localization for the remaining mobile robots 102 that are outdoors, for example, a group A of mobile robots that remains in a stationary state within the cluster 10, using the GPS signals received from the GPS satellites 1.

Next, the mother robot 100 performs a relative localization for the group B of mobile robots based on the group A of mobile robots. In this case, the relative localization can be performed via local area communication between the group B and group A of mobile robots.

Finally, the mother robot 100 determines the absolute location of the group B of mobile robots based on the absolute location of the group A of mobile robots.

Accordingly, even though one or more mobile robots in a cluster move to a shadow area, it is possible to achieve seamless localization.

Figure 3A:
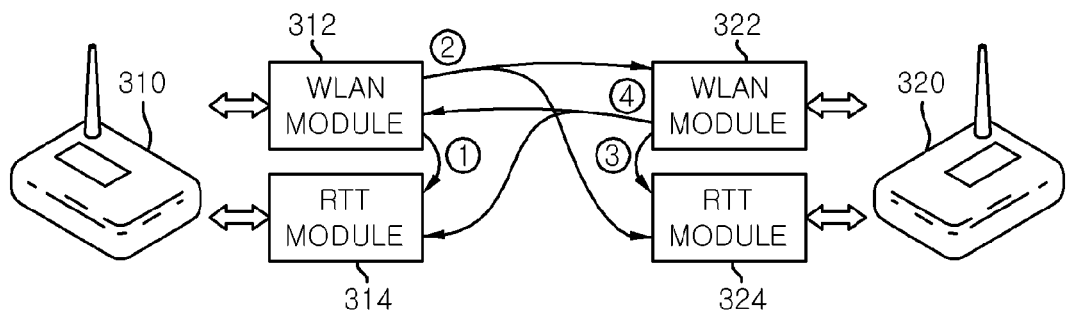
FIGS. 3A and 3B illustrate a diagram illustratively showing in a procedure for determining the relative locations of mobile robots.
Figure 3B:
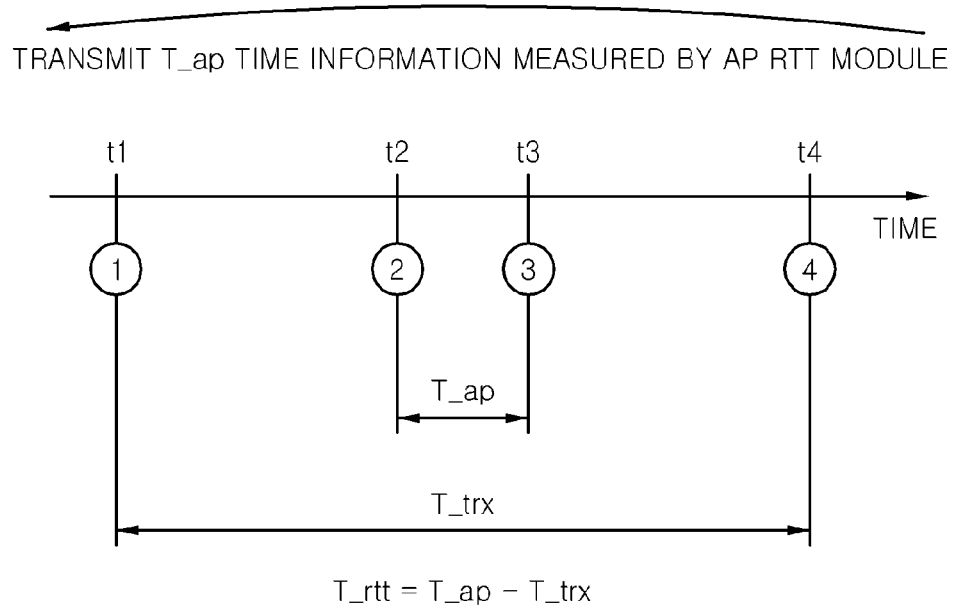

FIGS. 3A and 3B illustrates a diagram illustratively showing a procedure for determining the relative locations of mobile robots.

In order to determine the relative locations of mobile robots, WLAN Two-Way Ranging (TWR), for example, may be utilized. In order to utilize such WLAN TWR, a relative localization procedure using, for example, peer-to-peer networking between mobile robots may be included in the seamless localization method.

The TWR performed between robots will be described with reference with FIGS. 3A and 3B.

In stage 1, at time t1, a WAN module 312 of a first robot 310 provides a command to initiate a range counter to an RTT module 314 of the first robot 310 shortly before transmitting data to a second robot 320.

In stage 2, at time t2, both a wan module 322 and an RTT module 324 of the second robot 320 concurrently receive the data from the WAN module 312 of the first robot 310, and at the same time the first robot 310 initiates the range counter of the RTT module 314 of the first robot 310.

In stage 3, at time t3, if the second robot 320 is ready to transmit data to the first robot 310, the second robot 320 stops a range counter of the RTT module 324 shortly before transmitting the data to the first robot 310 via the wan module 322. In FIG. 3B, 't3-t2' represents a time interval T_ap taken to prepare a response by the first robot 310.

In stage 4, at time t4, both the wan module 312 and the RTT module 314 of the first robot 310 concurrently receive the data from the WAN module 322 of the second robot 320, and at the same time the second robot 320 stops the range counter of the RTT module 324 of the first robot 310.

Figure 4:
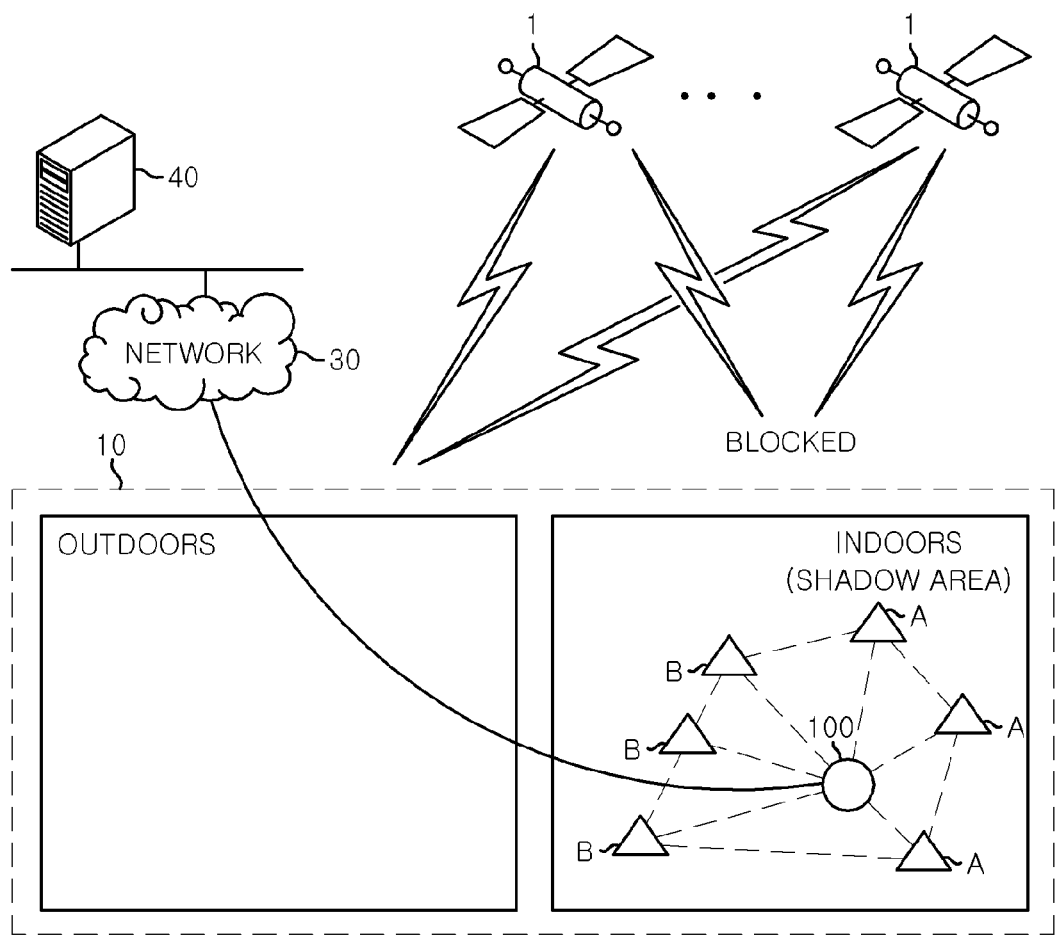
FIG. 4 is a diagram illustratively showing a method for performing seamless localization, in particular, the method performed when all mobile robots have moved to a GPS signal shade area in accordance with the present invention.

FIG. 4 is a diagram illustratively showing a method for performing seamless localization of mobile robots, in particular, the method performed when all mobile robots have moved to a GPS signal shadow area, in accordance with an embodiment of the present invention.

As shown in FIG. 4, the mother robot 100 within any mobile robot group, for example, the first cluster 10, is connected to the control center 40 via the WAN 30 and the mobile robots within the first cluster 10 performs an absolute localization through the use of GPS satellites 1.

In case where all mobile robots, for example, a group B of mobile robots inclusive of a group A of mobile robots within the first cluster 10, move to a shadow area where GPS signals cannot be received from the GPS satellites 1, there is no mobile robot that exists outdoors, and thus it is impossible to determine the absolute locations for all the mobile robots within the cluster 10 without the GPS signals.

In accordance with this embodiment of the present invention, the absolute locations of the group A and group B of mobile robots can be determined as follows.

First of all, since the relative localization for the group B of mobile robots has been performed as described above with reference to FIG. 2, the mother robot 100 determines the relative localization for the group A of mobile robots through the communication with the group B of mobile robots.

Next, the mother robot 100 calculates the absolute locations of the group A of mobile robots based on the absolute locations of the group B of mobile robots.

In an embodiment of the present invention, this procedure is repeated, so that the localization can be performed even in a shadow area.

The mobile robots applied to the embodiment of the present invention may implement communication over an ad-hoc mesh network within a short range.

As described above, in accordance with embodiments of the present invention, even if robots that are moving in an atypical environment move to a place where GPS signals cannot be received, the relative localization for the robots can be determined based on another robots having absolute localization through local area communication, for example, WLAN or WPAN communication. The embodiments of the present invention are intended to implement an indoor/outdoor seamless wireless localization technology for configuring an ad-hoc mesh network by using communication between robots moving in an atypical environment, and also configuring a system that can perform localization even in a shadow area by determining the relative localization of the robots and controlling the robots.

In accordance with the present invention, the real-time locations of robots can be detected by the high-accuracy localization of moving robots performed indoors or outdoors. By application of this technology, there can be implemented multi-cluster swarm intelligent robots which acquire context/environment information based on image and environment detection, transmit the context/environment information to an intelligent control center, and actively perform tasks thereof in cooperation with the robots.

While the invention has been shown and described with respect to the preferred embodiments, it will be understood by those skilled in the art that various changes and modifications may be made without departing from the spirit and scope of the invention as defined in the following claims.

What is claimed is:

1. A system for performing seamless localization, comprising:
    a plurality of mobile robots within a cluster, each mobile robot configured to receive Global Positioning System (GPS) signals to provide an absolute position;
    a network for providing a wide area communication environment for the plurality of mobile robots; and
    a control center configured to monitor when a first subgroup of the plurality of mobile robots moves to a shadow area where the GPS signals are not received while a second subgroup of the plurality of mobile robots receives the GPS signals, and to perform seamless localization for the first subgroup of the plurality of mobile robots over the network by:
        performing an absolute localization for the second subgroup of the plurality of mobile robots using the GPS signals;
        performing a relative localization for the first subgroup of the plurality of mobile robots based on the second subgroup of the plurality of mobile robots; and
        determining an absolute location of the first subgroup of the plurality of mobile robots based on the relative localization for the first subgroup of the plurality of mobile robots.

2. The system of claim 1, wherein the mobile robots comprise:
    a mother robot and one or more child robots,
    wherein the mother robot is configured to collect information about the absolute locations of the child robots, and transfer the information about the absolute location to the control center over the network; and
    the child robots are configured to perform a local area communication with the mother mobile robot.

3. The system of claim 2, wherein the network comprises Wide Area Network (WAN).

4. The system of claim 3, wherein the WLAN comprises a Wireless-Fidelity (Wi-Fi) network.

5. The system of claim 3, wherein the WPAN is any one of Bluetooth, ZigBee, and Ultra-Wideband (UWB) networks.

6. The system of claim 2, wherein the local area communication comprises a Wireless Local Area Network (WLAN) or a Wireless Personal Area Network (WPAN).

7. The system of claim 2, wherein the plurality of mobile robots are networked using an ad-hoc mesh network.

8. The system of claim 1, wherein the control center is further configured to monitor when the second subgroup of the plurality of mobile robots move to the shadow area where the first subgroup of the plurality of mobile robots have been moved, and perform the seamless localization by:
   determining a relative location of the second subgroup of the plurality of mobile robots based on the first subgroup of the plurality of mobile robots on which the relative localization has been performed; and
   determining an absolute location of the second subgroup of the plurality of mobile robots based on the relative location of the second subgroup of the plurality of mobile robots.

9. A method for performing seamless localization for mobile robots in a cluster, wherein a first subgroup of mobile robots moves to a shadow area where Global Positioning System (GPS) signals are not received while remaining second subgroup of mobile robots receives the GPS signals, the method comprising:
   performing an absolute localization for the second subgroup of mobile robots using the GPS signals;
   performing, using a wireless local area network (WLAN), a relative localization for the first subgroup of mobile robots based on the second subgroup of mobile robots; and
   determining an absolute location of the first subgroup of mobile robots based on the relative localization for the first subgroup of mobile robots.

10. The method of claim 9, further comprising:
   when the second subgroup of mobile robots move to the shadow area where the first subgroup of mobile robots have been moved, determining a relative location of the second subgroup of mobile robots based on the first subgroup of mobile robots on which the relative localization has been performed; and
   determining an absolute location of the second subgroup of mobile robots based on the relative location of the second subgroup of mobile robots.

11. The method of claim 9, wherein said performing a relative localization for the first subgroup of mobile robots based on the second subgroup of mobile robots includes performing communication between the first and second subgroup of mobile robots via local area communication.

12. The method of claim 11, wherein the local area communication is implemented using WLAN Two Way Ranging (TWR).

13. The method of claim 12, wherein the WLAN TWR comprises peer-to-peer networking within the group of mobile robots.

14. The method of claim 9, wherein the mobile robots are internetworked using an ad-hoc mesh network.

* * * * *